United States Patent [19]

Hayashida

[11] Patent Number: 4,687,978
[45] Date of Patent: Aug. 18, 1987

[54] POSITIONING INDEXING CONTROL DEVICE FOR INVERTER APPARATUS

[75] Inventor: Takahiro Hayashida, Aichi, Japan

[73] Assignee: Mitsubishi Denki Kabushiki Kaisha, Tokyo, Japan

[21] Appl. No.: 788,213

[22] Filed: Oct. 16, 1985

[30] Foreign Application Priority Data

Oct. 17, 1984 [JP] Japan ............................ 59-216336

[51] Int. Cl.$^4$ ............................................. G05B 11/28
[52] U.S. Cl. .................................. 318/599; 318/561; 318/759
[58] Field of Search ............... 318/561, 599, 758, 759, 318/801; 363/37

[56] References Cited

U.S. PATENT DOCUMENTS

| 3,828,236 | 8/1974 | Close ................................. 318/561 |
| 4,383,209 | 5/1983 | Lewis ............................. 318/561 X |
| 4,398,138 | 8/1983 | Kohzai et al. .................. 318/561 X |
| 4,450,393 | 5/1984 | Kohzai et al. .................. 318/561 X |
| 4,609,954 | 9/1986 | Bolton et al. .................... 318/561 X |

OTHER PUBLICATIONS

Excerpt from Maintenance Manual by Mitsubishi Electric Corp., Feb. 1983, BCN-21735-S5 N/59, "Spindle Drive Controller Type FR-SX".

Primary Examiner—Patrick R. Salce
Assistant Examiner—Marc S. Hoff
Attorney, Agent, or Firm—Bernard, Rothwell & Brown

[57] ABSTRACT

A positioning-indexing device for an inverter apparatus provided with an indexing command control circuit for making positioning and indexing control of an inverter apparatus with an induction motor connected thereto as a load adapted, upon receipt of an indexing command after the rotation of the motor has been stopped at a specific position, to read a new command for stopping at any other specific position and to allow the spindle of the motor to stop at the aimed stop position with its rigidity maintained, within one rotation thereof, and without presenting such phenomena as damped oscillation about the aimed stop position.

1 Claim, 6 Drawing Figures

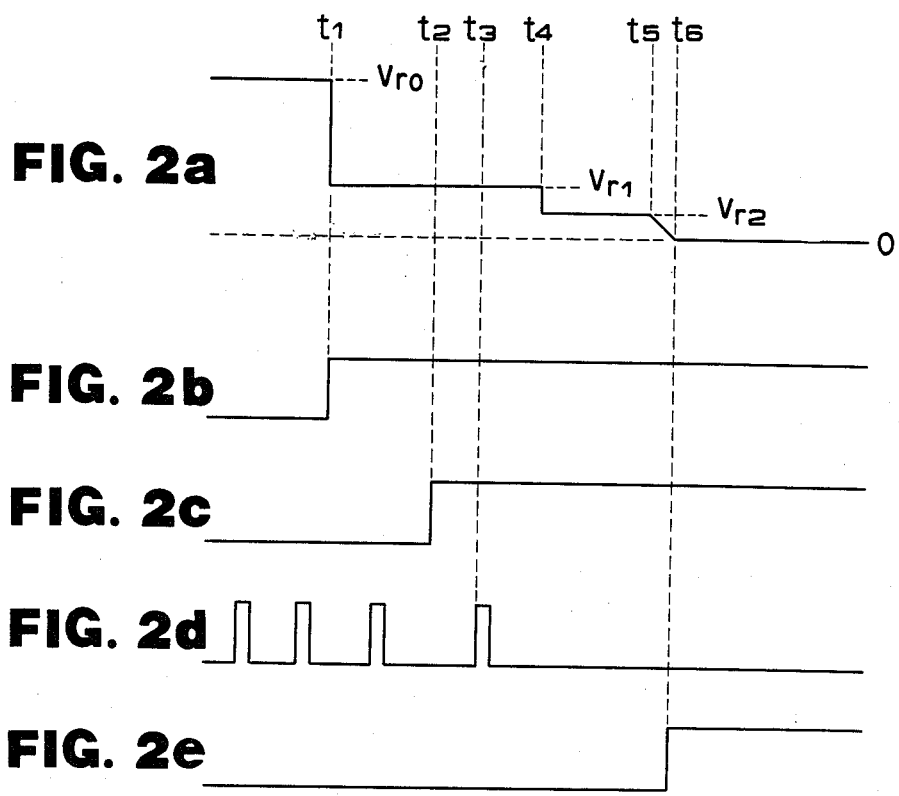
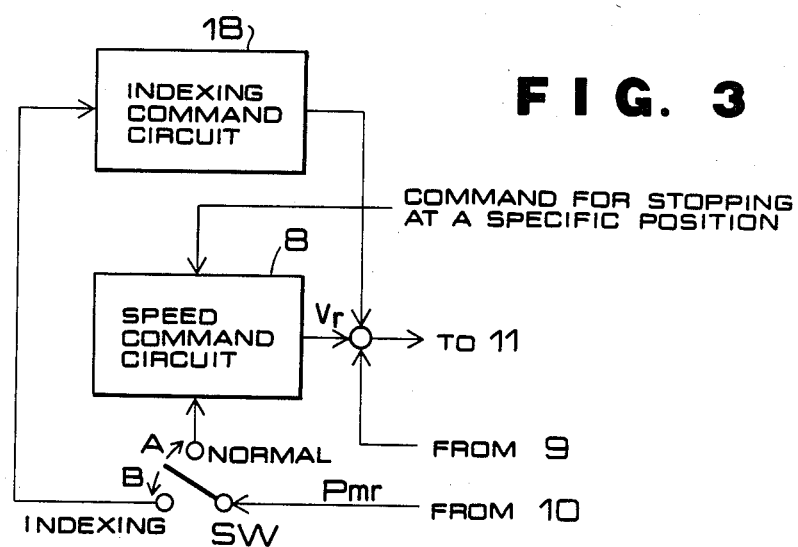

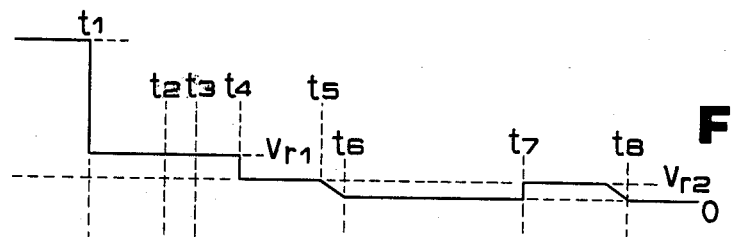
FIG. 4a
FIG. 4b
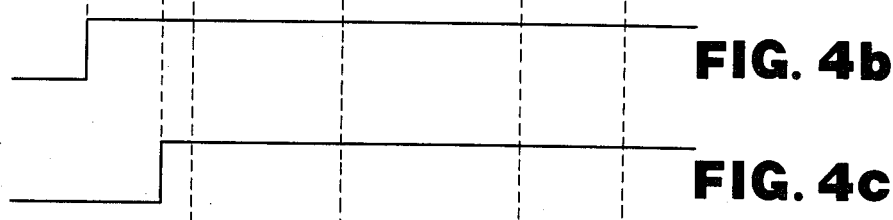
FIG. 4c
FIG. 4d
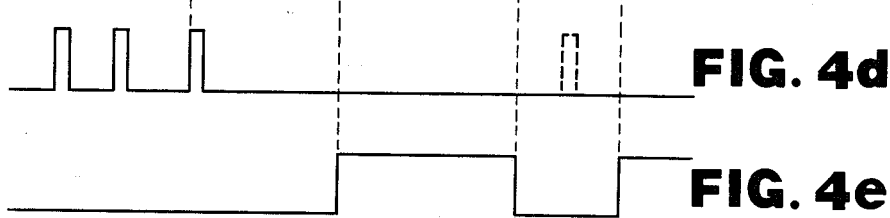
FIG. 4e
FIG. 4f

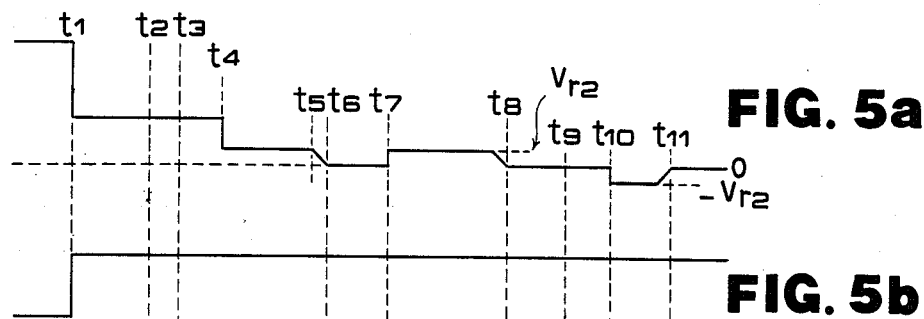
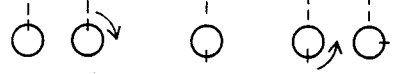

POSITIONING INDEXING CONTROL DEVICE FOR INVERTER APPARATUS

BACKGROUND OF THE INVENTION

1. Field of the Invention

The present invention relates to a positioning-indexing control device for an inverter apparatus and more particularly to positioning-indexing control device for inverter apparatus with an induction motor connected thereto as its load.

2. Description of the Prior Art

As the control device of this type the one as shown in FIG. 1 has previously been proposed.

Referring to FIG. 1, reference numeral 1 denotes a three-phase power source, 2 denotes a rectifying circuit formed of a diode, thyristor, and the like for rectifying the alternating current supplied by the power source 1, and 3 denotes a filter for smoothing the d.c. voltage from the rectifying circuit 2. And, 4 denotes an inverter apparatus formed of switching elements such as a transistor for converting the d.c. voltage from the rectifying circuit 2 into a pulse-width modulated variable-frequency a.c. voltage, 5 denotes an induction motor as the load of the inverter apparatus 4 (hereinafter to be referred to as a motor), 6 denotes a speed detector for detecting the rotational speed of the motor 5, 7 denotes a pulse generator for generating a mark pulse $P_{mo}$ which indicates a rotational position of the motor 5 and a positional pulse $P_m$, 8 denotes a speed command circuit for providing a standard speed $v_r$ as a speed command for the motor 5, and 9 denotes a speed detecting circuit for counting a speed signal $v_m$ output by the speed detector 6 and outputting a speed detected value $v_{mr}$ and a signal $v_{ma}$ which indicates that a designated speed has been reached. Further, 10 denotes a pulse detecting circuit for counting the mark pulse $P_{mo}$ from the pulse generator 7 and the positional pulse $P_m$ and outputting a position detected value $P_{mr}$ and an in-position signal $P_i$, 11 denotes a slip-frequency computing unit for computing a deviation $\Delta v$ of the speed detected value $v_{mr}$ from the standard speed $v_r$, 12 denotes a voltage-to-pulse converter in response to the sum of the deviation $\Delta v$ from the slip-frequency computing unit 11 and the speed detected value $v_{mr}$ from the speed detecting circuit 9, $v_{mr}+\Delta v$, for outputting a pulse $P_o$ whose frequency is proportional to a frequency command $f_o$, 13 denotes a voltage command circuit in response to the frequency command $f_o$ from the voltage-to-pulse converter 12 for outputting a voltage command $V_o$ which corresponds to the voltage-frequency characteristic of the motor 5, and 14 denotes a waveform generating circuit in response to the pulse $P_o$ and the voltage command $V_o$ for outputting a signal $V_r$ indicating the reference voltage waveform for PWM control. And, 15 denotes a voltage detecting circuit for detecting a signal $V_J$ indicating an output voltage of the inverter apparatus 4, 16 denotes a control circuit for outputting a signal $S_J$ for operating the inverter apparatus 4 in such a way that the deviation between the signal $V_r$ from the waveform generating circuit 14 and the signal $V_J$ is minimized, and 17 denotes an external output circuit for outputting the signal $v_{ma}$ indicating that the designated speed has been reached from the circuit 9 and the in-position signal $P_i$ from the circuit 10 to an external interface.

Now, with reference to the waveform diagram in FIG. 2, description will be made on the operation for stopping the rotation of the motor 5 at a predetermined position. Referring to FIG. 2, (a) represents a waveform of a speed command $v_r$, (b) that of a command for stopping at a predetermined position, (c) that of a signal $v_{ma}$ indicating that a designated speed has been reached, (d) that of a mark pulse $P_{mo}$, which is output at the rate of one pulse per rotation of the motor, and (e) represents a waveform of an in-position signal $P_i$ indicating completion of stoppage of the motor 5.

If the command for stopping at a predetermined position is input at the time point $t_1$, the speed command circuit 8 reduces the standard speed $v_r$ from $v_{r0}$ to $v_{r1}$, an orient speed (approximately, 100 to 200 rpm). At the time point $t_2$, the speed detecting circuit 9 detects that the rotational speed of the motor 5 has reached the standard speed $v_{r1}$ and outputs the signal $v_{ma}$ indicating that the designated speed has been reached. At the time point $t_3$, the mark pulse $P_{mo}$ is output from the pulse generator 7, whereupon counting of the positional pulse $P_m$ is started. At the time point $t_4$, the position detected value $P_{mr}$ indicates that the motor 5 has reached the position within approximately 180° of the aimed stop position, and so, the speed command circuit 8 reduces the standard speed $v_r$ to $v_{r2}$, a creep speed (approximately, 20 to 30 rpm). At the time point $t_5$, the motor 5 reaches the position within approximately 30° of the aimed stop position, and therefore, the control loop formed of the speed command circuit 8—the waveform generating circuit 14 is switched to a positional loop, whereby the standard speed $v_r$ becomes the speed to be determined by the gain in the positional loop. At the time point $t_6$, the motor 5 reaches the aimed stop position, and so, an in-position signal $P_i$ is output from the pulse detecting circuit 10 indicating that the motor 5 has stopped at the aimed stop position.

In such a device of the prior art, it has only been possible to designate one stop position at one time of the command for stopping at a predetermined position. And so, if it was desired to stop a motor at different positions, a command for stopping at another predetermined position had to be set and input after a previous command for stopping at a position was released. It therefore followed that the motor had to rotate more than one full rotation each time it operated at such a repeated command. Taking a case, by way of example, where cutting work is carried out with an attachment fitted to a spindle driven by a motor, it was impossible, after the attachment was stopped at a certain position and cutting was made at that position, to continue that cutting work with the attachment rotated and stopped within a full rotation of the previous position. Thus, there has been such a disadvantage that the function to stop the spindle at desired positions in the prior art was unable to meet multiple purposes.

SUMMARY OF THE INVENTION

The present invention has been made to overcome the disadvantage involved in the prior art device as described above. It is accordingly a primary object of the present invention to provide a positioning-indexing control device which enables a motor, after stopping at a predetermined position, to stop again at any positioning of the spindle within one rotation of that position without losing the rigidity thereof.

The above mentioned and other objects and features of this invention will become more apparent by reference to the following detailed description of the preferred embodiment of the invention with reference to the accompanying drawings.

BRIEF DESCRIPTION OF THE DRAWINGS

FIG. 2 is a diagram showing waveforms of signals from various parts shown in FIG. 1;

FIG. 3 is a block diagram showing a positioning-indexing device for an inverter apparatus of a preferred embodiment of the invention;

FIGS. 4 and 5 are diagrams showing waveforms of signals from various parts of the positioning-indexing control device as shown in FIG. 3.

DETAILED DESCRIPTION OF THE PREFERRED EMBODIMENTS

Figure 1:
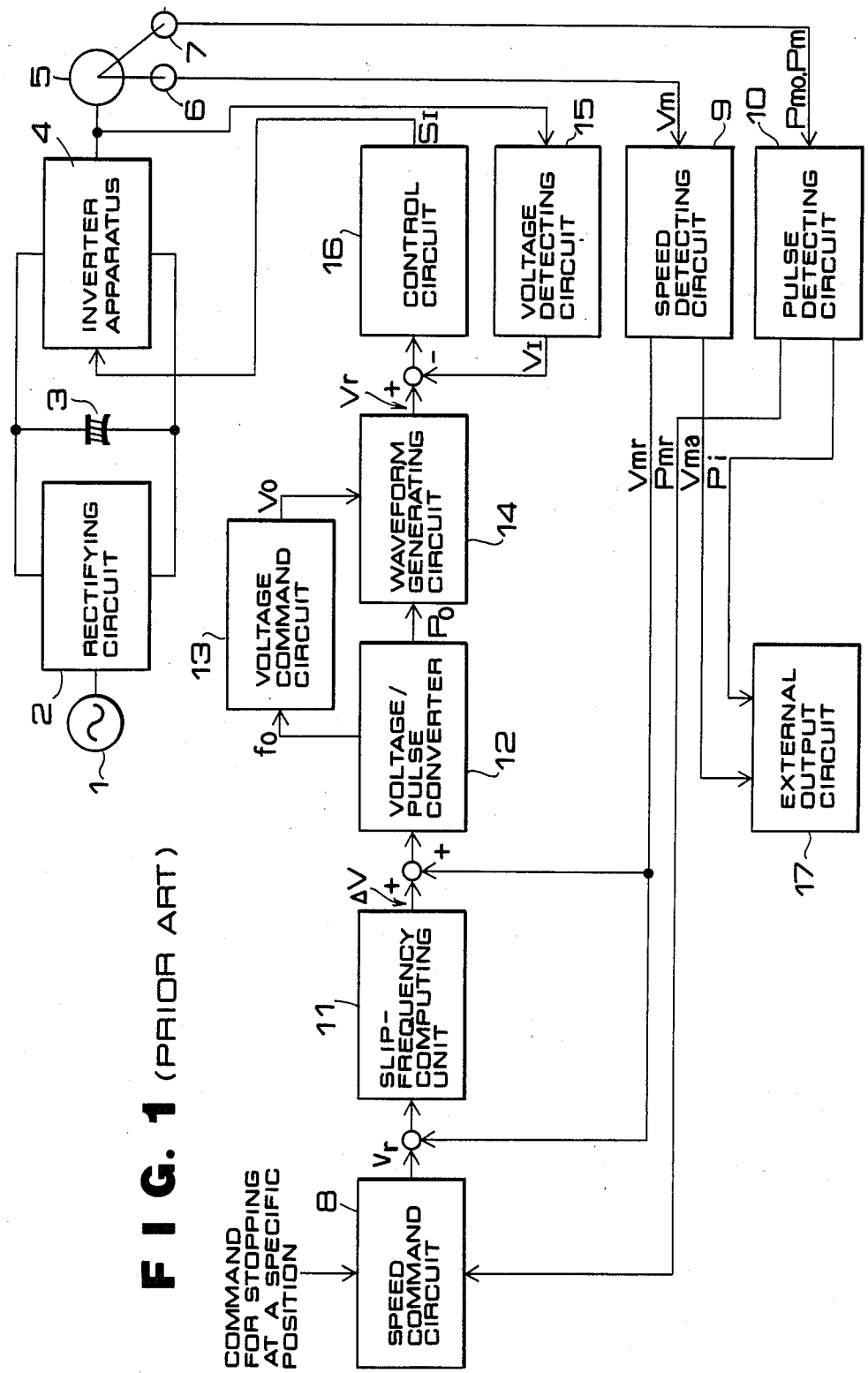
FIG. 1 is a block diagram showing a conventional positioning-indexing device for an inverter apparatus.

FIG. 3 is a block diagram showing a positioning-indexing control device of a preferred embodiment of the present invention, in which like or corresponding parts to those in FIG. 1 are omitted. In the drawing, reference character SW denotes a change-over switch, whereby the position detected value $P_{mr}$ from the pulse detecting circuit 10 is changed over to the speed command circuit 8 or to an indexing command circuit 18.

Now, operation of the device will be described with reference to waveform diagrams shown in FIGS. 4 and 5. Referring to FIGS. 4 and 5, the waveforms a to e represent signals from parts corresponding to those which provide the signals in FIG. 2, f represents an indexing command, g represents an indexing command for the positive rotation side, h represents an indexing command for the negative rotation side, and i represents operational positions of the spindle, in which the thick lines indicate the positions where the mark pulse $P_{mo}$ is generated.

The operations between the time points $t_1$ and $t_6$ are the same as described in FIG. 2. If an indexing command is output from the indexing command circuit 18 at the time point $t_7$, the speed command circuit 8 reads a new command for stopping at a specific position and sets the standard speed $v_r$ at $v_{r2}$ at the highest, so that phenomena of overshooting, passing the aimed stop position, and oscillating due to an excessively high rotational speed of the motor 5 will not be presented. In the present case, the switch SW is set at the position A at the time of normal operation and if a normal operation is stopped at a certain position, while under the control of an indexing command, the switch SW is set at the position B and a positional loop control is constantly executed. Since the standard speed $v_{r2}$ is output as an indexing command for the positive rotation side at the time point $t_7$ as indicated by g in FIG. 5, an in-position signal $P_i$ is output when the spindle has made a 180° rotation in the positive direction. Further, after the in-position signal $P_i$ is damped at the time point $t_9$, a standard speed $-V_{r2}$ is output as an indexing command at the time point $t_1$ as indicated by h in FIG. 5, and thus a new command for stopping at another specific position is read, and, upon rotation of the spindle by 90° in the negative direction, another in-position signal $P_i$ is output at the time point $t_{11}$.

Figure 6:
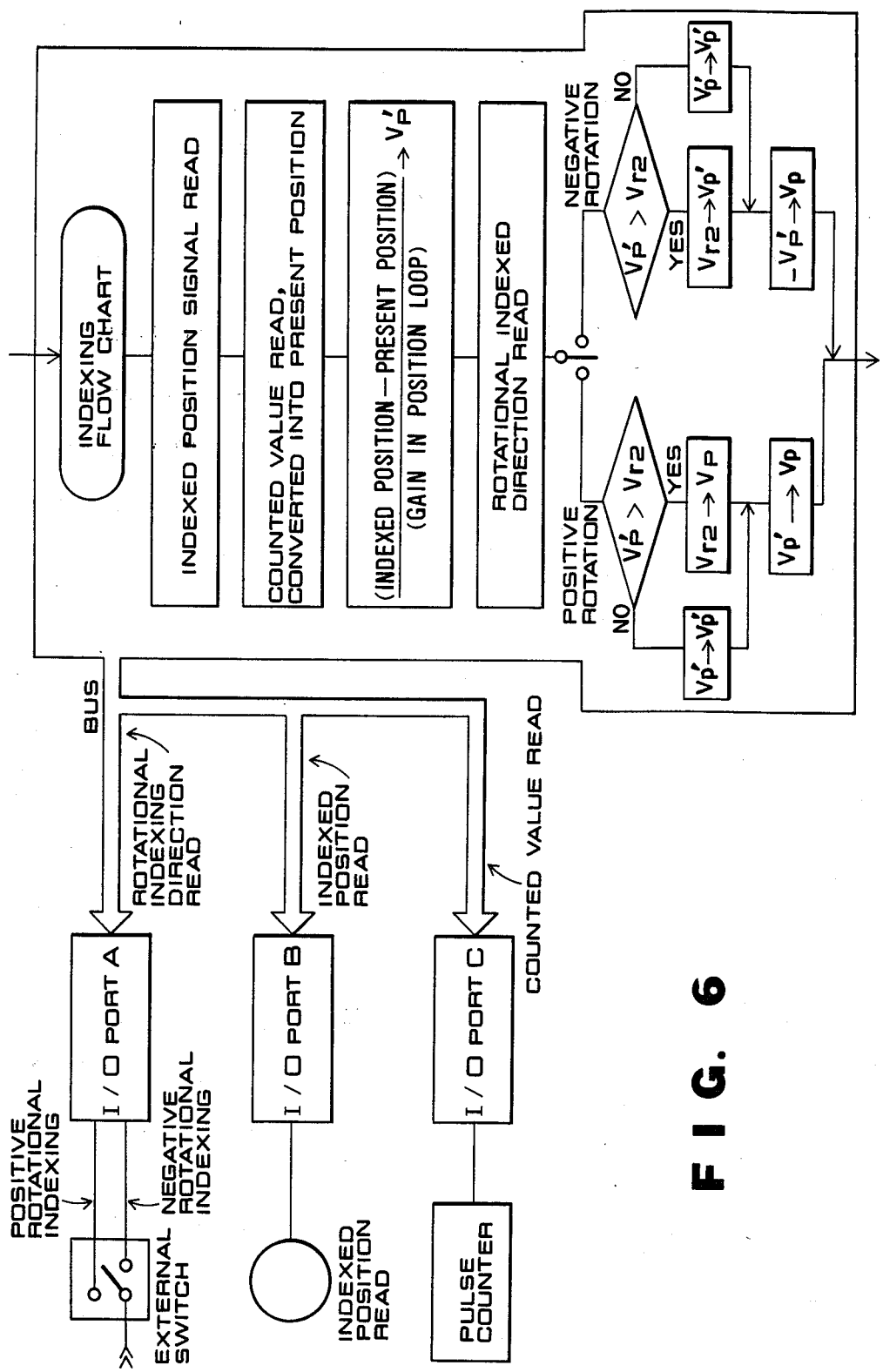
FIG. 6 is an explanation diagram for explaining operation of an indexing command circuit as shown in FIG. 3.

FIG. 6 is a diagram showing operation of the indexing command circuit 18 in FIG. 3.

(1) When the switch SW in FIG. 3 is set at B at the time of indexing control, the indexing command circuit 18 automatically starts the process according to the indexing flow chart.

(2) An indexed position signal is first read from the I/O port B, and its value is made to be an indexed position command.

(3) Then, a counted value from a pulse counter as a part of the pulse detecting circuit 10 (FIG. 3) is read from the I/O port C and the counted value is converted into the present position.

(4) Then, in order to provide the deviation of the present position from the indexed position as the standard speed, the following computation is made:

$v_p'$ = (divided position—present position)/(gain in position loop), where the gain in position loop is a value to be determined by response characteristics of the inverter and the motor.

(5) It is read from the I/O port A whether at positive rotational indexing or at negative rotational indexing the setting of the external switch SW is made.

The value obtained as follows is given as the standard speed for the indexing command circuit 18:

(6)-1 in the case of positive rotational indexing:

$$\left. \begin{array}{l} \text{if } v_p' \text{ in (4)} > v_{r2}, \text{ then } v_{r2} \to v_p' \\ \text{if } v_p' \text{ in (4)} \leq v_{r2}, \text{ then } v_p' \to v_p' \end{array} \right\} \ v_p' \to v_p \text{ and}$$

(6)-2 in the case of negative rotational indexing:

$$\left. \begin{array}{l} \text{if } v_p' \text{ in (4)} > v_{r2}, \text{ then } v_{r2} \to v_p' \\ \text{if } v_p' \text{ in (4)} \leq v_{r2}, \text{ then } v_p' \to v_p' \end{array} \right\} \ -v_p' \to v_p$$

According to the present invention as described so far, the control has been made possible to stop the spindle within one rotation thereof by inputting an indexing command in the device, and therefore, the functions to be performed after the motor has stopped at a specific position can be enhanced. Besides, by means of detection of the positional deviation, sufficient rigidity is provided. Thus, control for stopping at a specific position highly reliable and applicable to multiple purposes has been made attainable.

What is claimed is:

1. In a positioning-indexing control device for an inverter apparatus which supplies a pulse-width modulated current to drive a motor, said control device including a pulse detecting circuit responsive to a mark pulse and a position pulse indicating a rotational position of a motor for detecting a position for said motor to stop and for outputting a first in-position signal, and a speed command circuit for outputting a speed command to said inverter apparatus for determining the rotational speed of said motor until said first in-position signal is output, said positioning-indexing control device futher comprising an indexing command circuit and a switch movable to a first position for connecting said pulse detecting circuit to said speed command circuit for transmitting said first in-position signal from said pulse detecting circuit to said speed command circuit, said indexing command circuit having an output connected to the output of said speed command circuit to provide a second speed command until a second in-position signal is output from said pulse detecting circuit, said second speed command having polarity indicative of the rotating direction of said motor and a value smaller than the speed command output from said speed command circuit.

* * * * *